(12) United States Patent
McClay

(10) Patent No.: US 6,708,809 B2
(45) Date of Patent: Mar. 23, 2004

(54) CLUTCH SHAFT STRESS RELIEF

(76) Inventor: Scott McClay, 21605 Brook Dr., Tehachapi, CA (US) 93561

( * ) Notice: Subject to any disclaimer, the term of this patent is extended or adjusted under 35 U.S.C. 154(b) by 0 days.

(21) Appl. No.: 10/256,932

(22) Filed: Sep. 27, 2002

(65) Prior Publication Data

US 2003/0057052 A1 Mar. 27, 2003

Related U.S. Application Data

(63) Continuation-in-part of application No. 09/591,783, filed on Jun. 12, 2000, now abandoned.

(51) Int. Cl.$^7$ ................................................. F16C 3/00
(52) U.S. Cl. ................................. 192/110 R; 464/179
(58) Field of Search .................... 192/110 R, 110 S; 464/179

(56) References Cited

U.S. PATENT DOCUMENTS

| | | | | |
|---|---|---|---|---|
| 3,608,936 A | * | 9/1971 | Karden ............................ 403/9 |
| 4,622,081 A | * | 11/1986 | Stickels et al. .............. 420/111 |
| 4,653,683 A | * | 3/1987 | Pavlick ........................ 228/182 |
| 5,462,489 A | * | 10/1995 | Kan et al. .................... 464/179 |
| 5,538,121 A | * | 7/1996 | Hering ................... 192/110 S |
| 6,132,135 A | * | 10/2000 | Gerber et al. ............... 464/179 |

FOREIGN PATENT DOCUMENTS

| | | | |
|---|---|---|---|
| GB | 2 066 418 A | * | 7/1981 |
| JP | 2-17228 A | * | 1/1990 |
| WO | WO 89/10272 A1 | * | 11/1989 |

OTHER PUBLICATIONS

Pilkey, Walter D., "Peterson's Stress Concentration Factors" Second Edition, pp. 60–62.*

* cited by examiner

*Primary Examiner*—Rodney H. Bonck
(74) *Attorney, Agent, or Firm*—Dennis W. Beech

(57) ABSTRACT

An improved clutch drum and input shaft assembly or intermediate shaft for the transfer of torsional force in a vehicle transmission having a fillet or concave groove structure and a hardened steel shaft. The improved clutch drum and input shaft has additional material in the spline portion of the shaft as well as improved fillet and transition surfaces between the spline and the first bearing element as compared to existing transmission shafts. The strength and durability of the improved transmission shaft is also modified with materials and hardening beyond the existing transmission shaft steel and hardening grades. Additional welds to attach a clutch drum to the shaft are employed instead of a single laser electron beam weld.

14 Claims, 4 Drawing Sheets

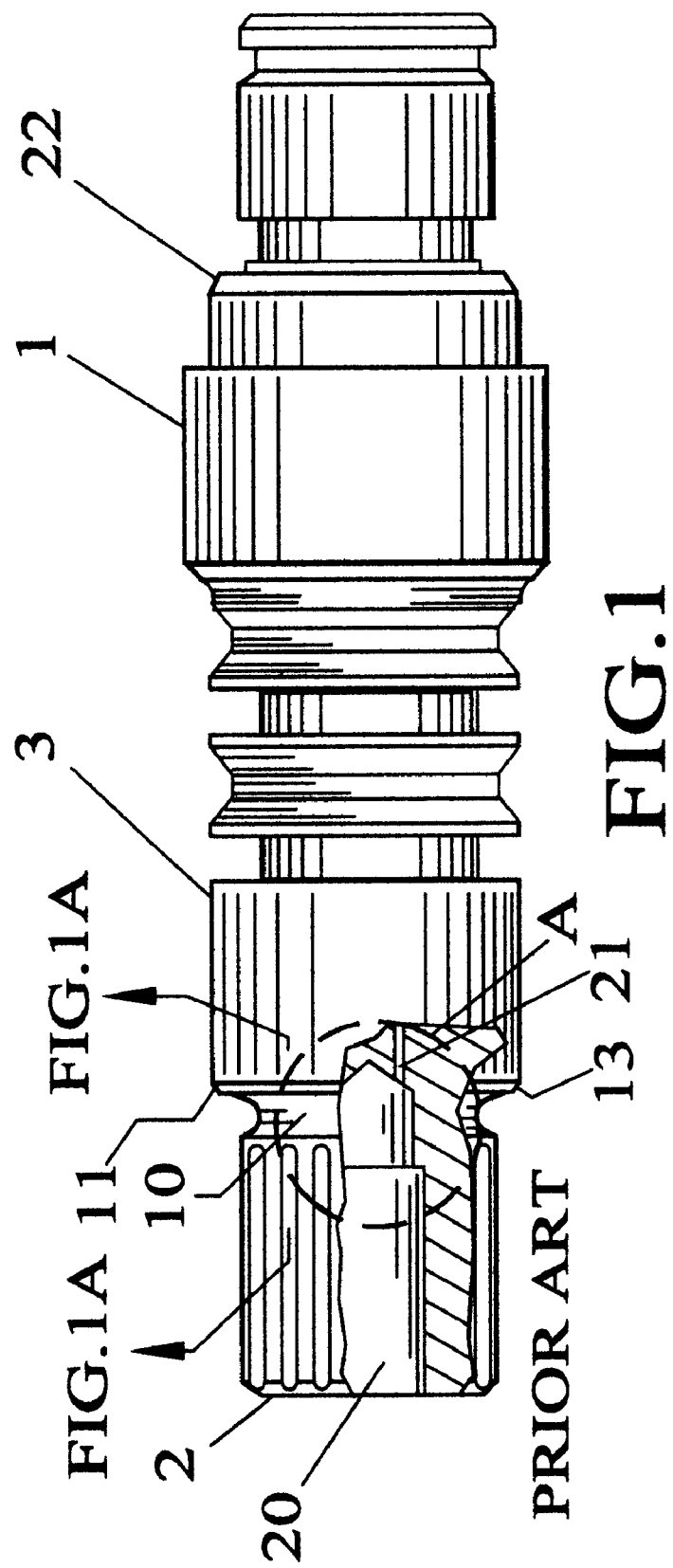

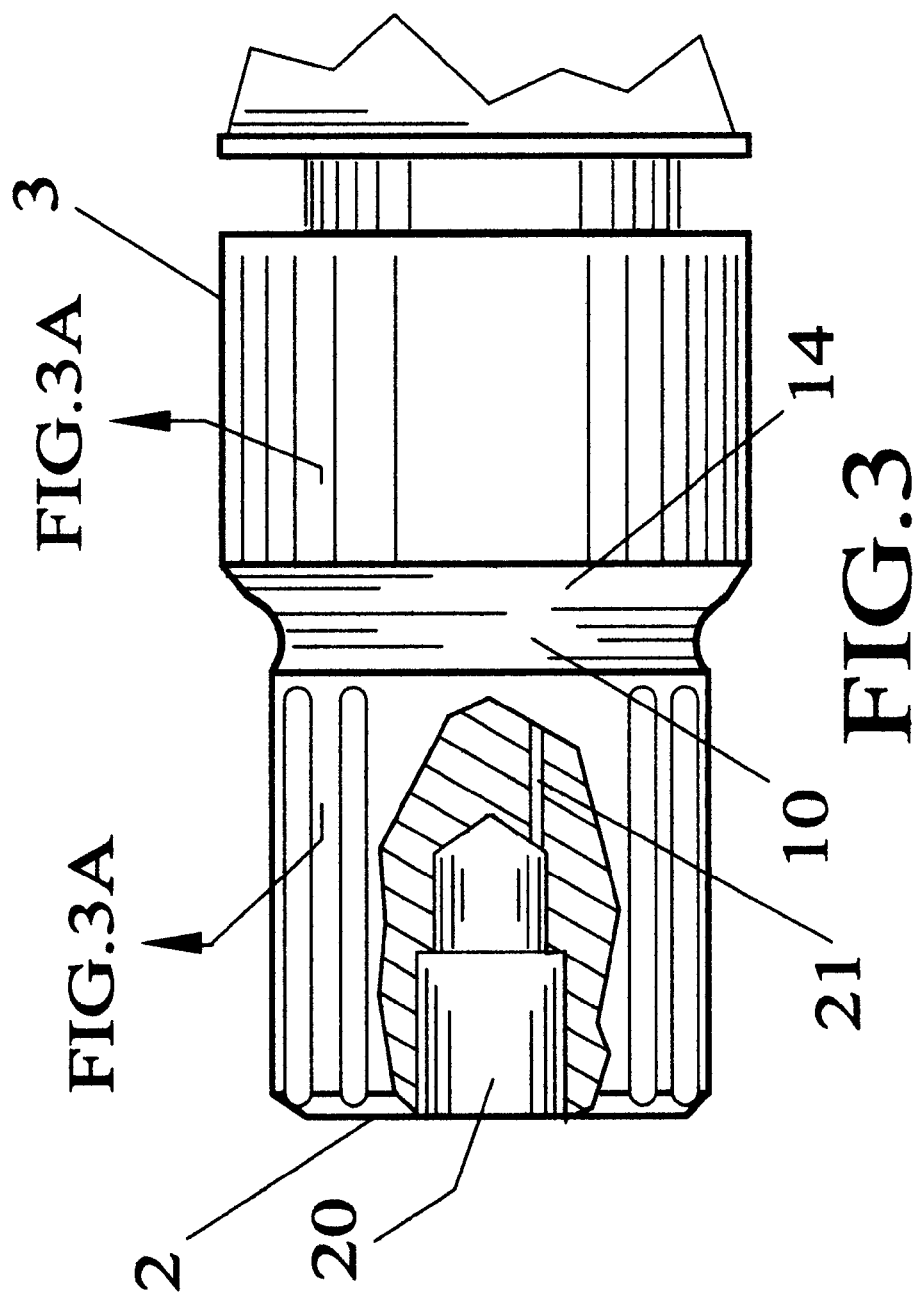

CLUTCH SHAFT STRESS RELIEF

This is a continuation-in-part of application Ser. No. 09/591,783 filed on Jun. 12, 2000 which application is now abandon.

BACKGROUND OF THE INVENTION

1. Field of the Invention

This invention relates to devices used to transfer torsional force for vehicle transmissions. The improved device structure provides simple modifications to reduce shaft stress concentration locations, increase material thickness in selected areas, add weld attachments and improve shaft strength and hardening.

2. Description of Related Art

There are currently in use many configurations of clutch drum and torsional shafts for vehicle transmissions. Such assemblies are generally designed to specific parameters related to the clutch assembly in which the shaft will be used. However, within these specifications there may still be variations in materials, spline and bearing interfaces, fillet groove transitions and shaft dimensions. The variance in these parameters may affect the torsional strength of the shaft assembly.

The present invention provides a simple means to reduce stress concentration locations and improve the strength of clutch shaft assemblies. This is done by use of improved fillet radius transitions, change of the inner front bushing hole, improved grade of alloy steel and hardening, and added welding locations for the shaft and clutch drum assembly.

SUMMARY OF THE INVENTION

One object of the present invention is improved durability of clutch shafts related to clutch drums or intermediate clutch assemblies. Another object is the simple modification of existing clutch shaft application replacement parts.

These and other features, aspects and advantages of the present invention will become better understood with reference to the following drawings, description and claims.

BRIEF DESCRIPTION OF THE DRAWINGS

FIG. 1 illustrates a side view with partial cut away of an existing art clutch shaft;

FIG. 3 illustrates an enlarge side view of the spline end;

DETAILED DESCRIPTION

The following detailed description represents the best currently contemplated modes for carrying out the invention. The description is not to be taken in a limiting sense, but is made merely for the purpose of illustrating the general principles of the invention.

The improved strength clutch shaft involves the modification of the spline end and drum end of the shaft. The material strength from which the clutch shaft is manufactured and the hardening process is also modified. The preferred embodiment is presented relative to clutch shafts and clutch plates for the GENERAL MOTORS HYDRAMATIC 2004R transmission; however, the modifications may be applied to any clutch shaft that would be improved by use of such modifications.

Figure 1A:
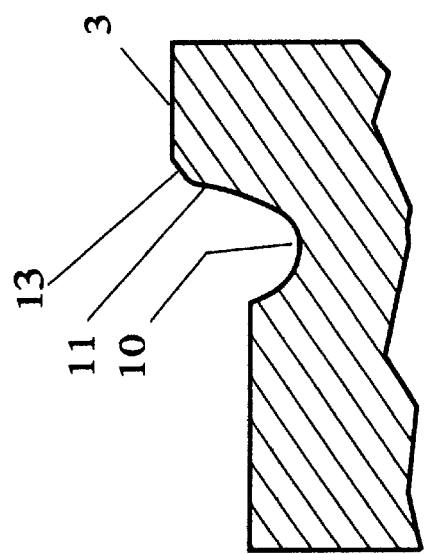
FIG. 1A illustrates a partial cross sectional view of the fillet portion of the clutch shaft of FIG. 1.

Referring to FIG. 1, a typical clutch shaft 1 for a GENERAL MOTORS HYDRAMATIC 2004R transmission is illustrated. There is a fillet 10 formed between the spline end 2 and first bearing element 3. The fillet 10 has a relatively small radius as compared to the vertical step transition 11 from the fillet 10 curvature to the first bearing element 3. The vertical step transition may be approximately 0.04 inches. This structure creates an interface that is structurally a weak link wherein use of the clutch shaft 1 causes the shaft to break at the fillet 10 prematurely as compared to the other shaft elements. There may be a small beveled edge 13 to eliminate a sharp corner of the first bearing element 3 wherein the beveled edge 13 may be at an approximately 45 degree angle from vertical relative to the longitudinal axis of the shaft and have a 0.02 inch depth change as measured from the outside surface of the first bearing element 3.

Figure 3A:
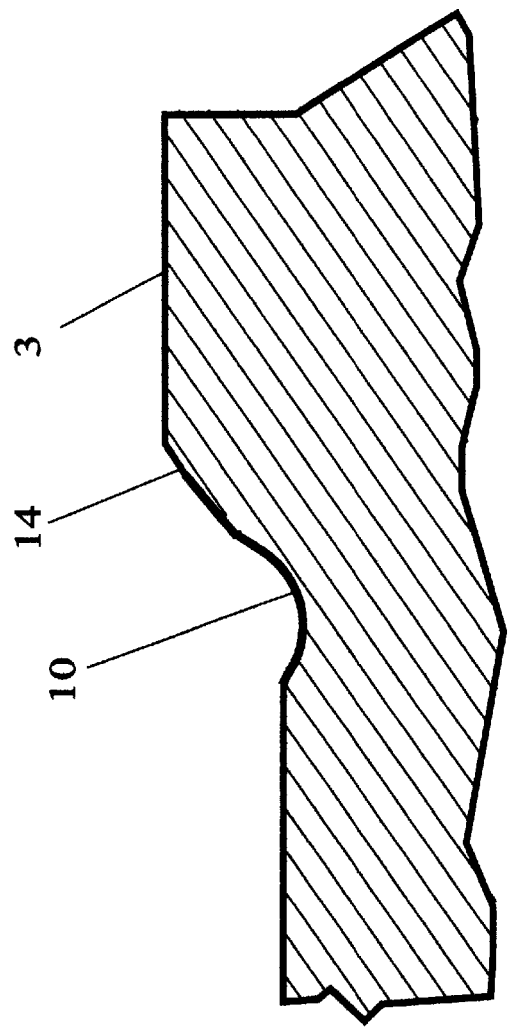
FIG. 3A illustrates a partial cross sectional view of the fillet portion of the clutch shaft of FIG. 3.
Figure 2:
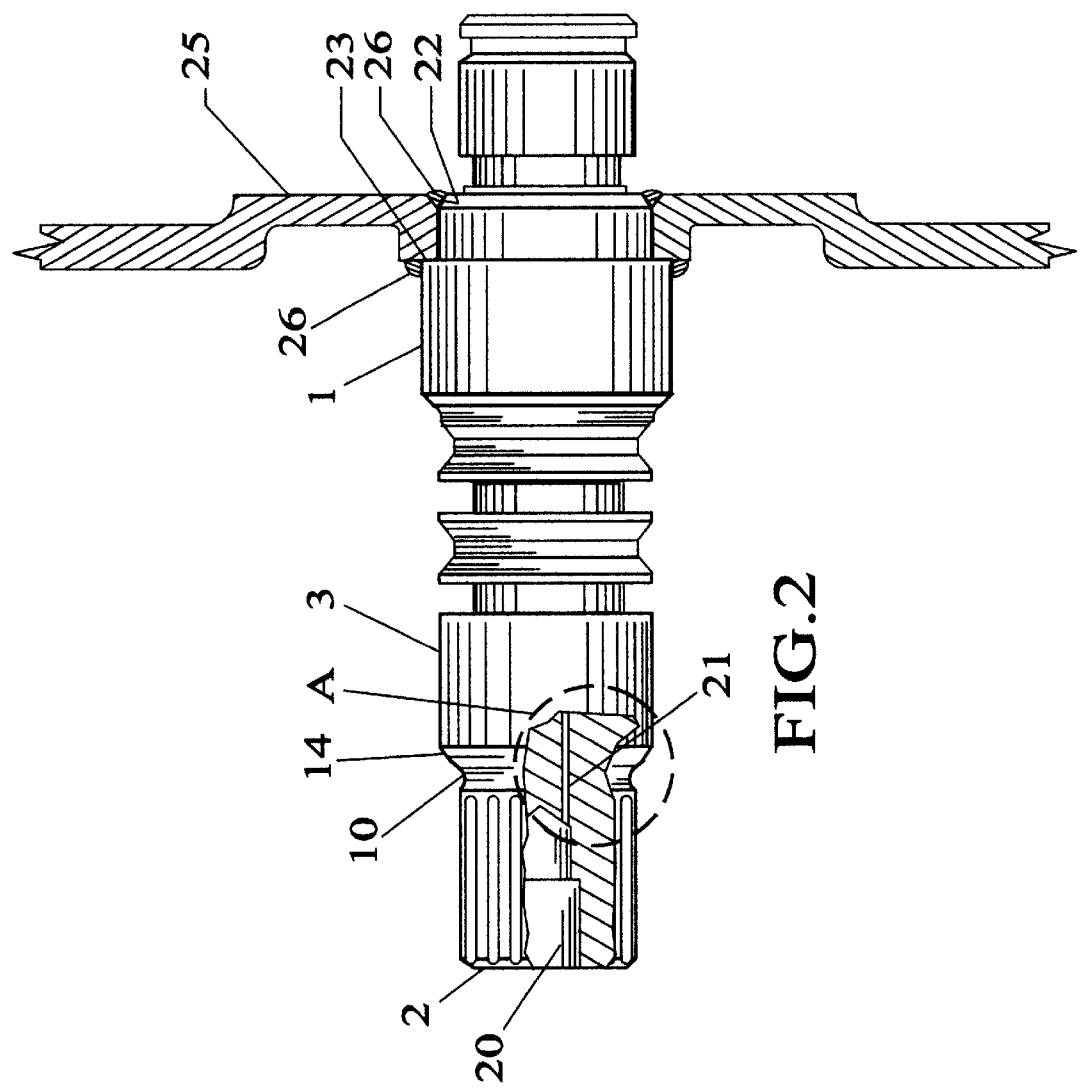
FIG. 2 illustrates a side view with partial cut away of the new clutch shaft.

Referring to FIGS. 1 through 3, a clutch shaft 1 is modified at fillet 10 by increasing the fillet radius. This modification increases shaft strength by reduction of stress concentration at the fillet 10. Additionally chamfered edge 14 has an increased chamfer as compared to beveled edge 13 to further reduce stress concentrations. This improved structure strengthens the shaft at the weakest location to provide durability for longer life of shaft use.

The first bearing element 3 for the 2004 R prior art clutch shaft as well as the improved clutch shaft 1 may have an outside diameter D of 1.042 inches and the spline end 2 may have a diameter d of 0.835 inches not including the splines. In the case of the 2004 R prior art, a fillet 10 radius r of 0.046 inches was used. The ratio r/D of the fillet 10 to diameter D may then be 4½%. This radius for the fillet 10 required an approximately vertical step transition 11 of approximately 0.04 inches and the combination of factors between the spline end 2 and first bearing element 3 created a weak stress point in clutch shaft 1 of the prior art.

Using the well known treatise of the R. E. Peterson, *Stress Concentration Factors* (1974) publication, the stress concentration factor $K_{TS}$ may be calculated for r=0.046 inches, d=0.835 inches and D=1.042 inches to be a value of 1.54. The higher the $K_{TS}$ the more likely the clutch shaft 1 is to fail in the area of the fillet 10 under stress.

In experiments it was found that raising the r/D ration to a value of approximately 6½% improved the reliability of the clutch shaft 1. The 6½% ratio may be structured with the parameters d=0.835 inches, D=0.922 inches and r=0.06 inches wherein the vertical step transition 11 of the prior art may be eliminated. While the first bearing element 3 may have an outside diameter of 1.042 inches, this may be reduced to an effective diameter of D=0.922 inches at the fillet by chamfered edge 14. The chamfered edge 14 may reduce the diameter at the fillet transition point by 0.12 inches if a 0.06 inch chamfer depth change from the outside surface of the first bearing element 3 is created. Also, changing the fillet radius to r=0.06 inches may allow for a relative smooth transition between fillet 10 and chamfered edge 14. The $K_{TS}$ factor according to the R. E. Peterson publication for these parameters may be a value of 1.34.

An additional improvement to existing shafts is a reduced depth inner front bushing hole 20 at spline end 2. The existing art machines the hole 20 to a depth approximately coplanar with the fillet 10, as illustrated by A in FIG. 1. The reduced depth hole 20 maintains the material structure of the shaft in the area of the fillet 10. The hole 20 depth is only formed to allow insertion of the front bushing attachment, with appropriate adjustment of lubrication channel 21, and therefore is at a depth that is not adjacent the fillet 10 as illustrated in FIG. 2 by point A and in FIG. 3. This improvement increases the material structure of the shaft I in the vicinity of the highly stressed fillet 10. This in combination with the modified fillet 10 structure increases the strength and related torsional force fracture resistance of the shaft 1.

A further improvement may be implemented to increase strength as compared to existing art. The material used to manufacture an existing clutch shaft 1 is typically a low alloy grade 1548 or 5140 steel, which produces a hardness factor of approximately Rc 39–41 after hardening. This design produces an approximately 180,000 psi tensile strength range shaft 1. The material strength and hardening process used to manufacture the improved shaft 1 are increased. This change in grade of steel and hardening provides good ductility with relatively high impact strength and hardness. The new material strength and hardening are accomplished while maintaining the ability to weld the shaft 1 to a clutch drum 25. The hardness of the new clutch shaft 1 is in the approximate range of 46 to 48 Rc. Examples of currently available material include HY-TUF, VASCO 300M, AERO MET 100 and 4XXX series steel. The hardening process includes treating, quenching and tempering the steel to enhance impact strength and toughness and to maintain ductility as compared to carbonizing a steel part for purposes of improved wear.

The attachment of the clutch drum 25 to the shaft 1 by means of laser electron beam radial welding is accomplished circumferentially at first surface 22 and second surface 23. This provides welding 26 on each side of the clutch drum. Current welding practice is performed only at first surface 22. The secondary weld 26 is added in series to improve torsional strength.

The combination of the above structural elements increases the strength and useful life as demonstrated in the tested use of prototypes.

While the invention has been particularly shown and described with respect to the illustrated embodiments thereof, it will be understood by those skilled in the art that the foregoing and other changes in form and details may be made therein without departing from the spirit and scope of the invention.

I claim:

1. An improved clutch shaft for transfer of torsional force in vehicle transmissions wherein the improvement comprising:
   a clutch shaft having a fillet formed between a spline end and a first bearing element; and
   a ratio of a radius of said fillet to a diameter of said first bearing element at a transition point therebetween is greater than 4½ percent.

2. The improved clutch shaft as in claim 1 wherein said ratio is approximately 6½ percent.

3. The improved clutch shaft as in claim 1 wherein said first bearing element having a chamfered edge adjacent said fillet.

4. The improved clutch shaft as in claim 1 wherein said spline end having a hole therein and the depth of said hole does not extend to the position of said fillet.

5. The improved clutch shaft as in claim 1 wherein said clutch shaft is attached to a clutch drum by welding circumferentially around said clutch shaft on both sides of said clutch drum.

6. The improved clutch shaft as in claim 1 wherein said clutch shaft is manufactured of steel having good ductility with relatively high impact strength while maintaining weldability of said clutch shaft with a hardness level greater than 42 Rc.

7. An improved clutch shaft for transfer of torsional force in vehicle transmissions wherein the improvement comprising:
   a clutch shaft having a fillet formed between a spline end and a first bearing element; and
   a ratio of a radius of said fillet to a diameter of said first bearing element and said spline end at a transition point therebetween is a stress concentration factor value less than 1.54.

8. The improved clutch shaft as in claim 7 wherein said stress concentration factor is approximately 1.34.

9. The improved clutch shaft as in claim 7 wherein said first bearing element having a chamfered edge adjacent said fillet.

10. The improved clutch shaft as in claim 7 wherein said spline end having a hole therein and the depth of said hole does not extend to the position of said fillet.

11. The improved clutch shaft as in claim 7 wherein said clutch shaft is attached to a clutch drum by welding circumferentially around said clutch shaft on both sides of said clutch drum.

12. The improved clutch shaft as in claim 7 wherein said clutch shaft is manufactured of steel having good ductility with relatively high impact strength while maintaining weldability of said clutch shaft with a hardness level greater than 42 Rc.

13. An improved clutch shaft for transfer of torsional force in a vehicle transmission wherein the improvement comprising:
   a clutch shaft having a fillet formed between a spline end and a first bearing element having a chamfered edge adjacent said fillet;
   a ratio of a radius of said fillet to a diameter of said first bearing element at a transition point therebetween is approximately 6½ percent;
   said spline end having a hole therein and the depth of said hole does not extend to the position of said fillet;
   said clutch attached to a clutch drum by welding circumferentially around said clutch shaft on both sides of said clutch drum; and
   said clutch shaft is manufactured of steel having good ductility with relatively high impact strength while maintaining weldability of said clutch shaft with a hardness level greater than 42 Rc.

14. The improved clutch shaft as in claim 13 wherein said ratio further comprising a stress concentration factor for said radius of said fillet, said diameter of said first bearing element and a diameter of said spline end wherein said stress concentration factor is approximately 1.34.

* * * * *